VARIABLE RELUCTANCE-TYPE PICKUP UTILIZING ANISOTROPIC POLE PIECES

Filed Feb. 1, 1967

2 Sheets-Sheet 1

INVENTORS
YOSHIO TAWARA
ATSUSHI IGA

BY Wenderoth, Lind & Ponack
ATTORNEYS

INVENTORS
YOSHIO TAWARA
ATSUSHI IGA

BY Wenderoth, Lind & Ponack
ATTORNEYS

United States Patent Office 3,515,817
Patented June 2, 1970

3,515,817

VARIABLE RELUCTANCE-TYPE PICKUP UTILIZING ANISOTROPIC POLE PIECES

Yoshio Tawara, Kadoma-shi, and Atsushi Iga, Hirakatashi, Japan, assignors to Matsushita Electric Industrial Co., Ltd., Osaka, Japan

Filed Feb. 1, 1967, Ser. No. 613,189
Int. Cl. H04r *11/12*
U.S. Cl. 179—100.41 5 Claims

ABSTRACT OF THE DISCLOSURE

A transducer for use as a phonograph pickup which has a magnetic circuit including a pole piece of an anisotropic ferromagnetic material which concentrates a magnetic leakage flux in an air gap near the magnetic circuit, and a cantilever arm of non-magnetic material having the needle on one end thereof and a flux modulating member thereon positioned in the air gap near the magnetic circuit, so that the movements of the cantilever arm and flux modulating member vary the flux in the magnetic circuit. A pickup coil is provided for the magnetic circuit. Two parallel circuits can be provided with the pole pieces having end faces at right angles to each other, so that a single cantilever arm and flux modulating member can be used to pick up from a stereophonic record.

BACKGROUND OF THE INVENTION

Field of the invention

This invention relates to improved electrical sound transducers of the variable reluctance type, and more particularly to an acoustical electrical transducer.

Description of the prior art

At present, magnetic phonograph pickup cartridges of the variable reluctance type are readily available. For example, U.S. Pat. 2,864,897 to Kaar as well as U.S. Pat. 3,047,677 to Pritchard disclose this type of cartridge. According to the inventions disclosed in these patents, magnetic flux from one pole of a permanent magnet flows to the opposite pole of the magnet through an armature of a ferromagnetic material and having a needle thereon, an air gap between the armature and a magnetic yoke, and a pair of magnetic yokes provided with a pair of coils. The movement of the armature due to the vibratory motion of the needle along the undulations of the groove of a phonograph record modulates the reluctance of the air gap so as to induce signals in the coils. The armature in these prior art cartridges must be made of a ferromagnetic material such as mu metal or Permalloy because it forms a part of the flux path therein.

On the other hand, it is desirable to keep the mass of the stylus assembly which is required to oscillate at a minimum in order to reduce the deleterious effects thereof upon the quality of reproduction from a phonograph record. However, because of the limitation that the armature must be a ferromagnetic material, a light metal such as aluminum cannot be used in these variable reluctance-type prior art pickup cartridges.

SUMMARY OF THE INVENTION

An object of this invention is to provide an improved variable reluctance-type magnetic phonograph pickup, which comprises an anisotropic ferromagnetic body attached to one pole of a yoke.

Another object of the invention is to provide an improved variable reluctance-type magnetic phonograph pickup which includes an armature which is substantially all non-magnetic metal and which has a small oscillating mass.

The transducer of the invention comprises pole pieces of anisotropic ferromagnetic material magnetically coupled to one pole of a permanent magnet, said pole pieces being in contact with one pole of a yoke and arranged so as to concentrate a magnetic leakage flux in an air gap between said pole pieces, and flux modulating member attached to a non-magnetic material armature and movable in said air gap during movement of said armature.

BRIEF DESCRIPTION OF THE DRAWINGS

The invention will now be described in connection with the accompanying drawings in which.

DESCRIPTION OF A PREFERRED EMBODIMENT

Figure 1:
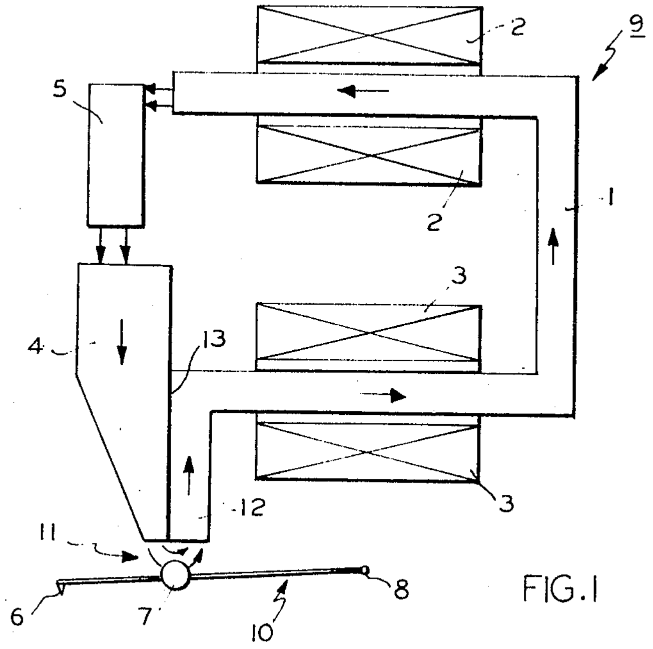
FIG. 1 is a schematic diagram illustrating the fundamental construction and operating principle of the variable reluctance type pickup cartridge of the present invention.

Before proceeding with a detailed description of the novel acoustical electrical transducer of the present invention, the fundamental construction and operating principle thereof will be explained with reference to FIG. 1 wherein the magnetic circuit of the novel acoustical-electrical transducer is designated, as a whole, by reference numeral 9 and the armature is designated 10. As a practical matter, the novel acoustical-electrical transducer comprises two parallel magnetic circuits which are mutually independent and one armature. Since the operating principle does not differ whether there are one or two magnetic circuits, the discussion of the fundamental construction and operation will, for convenience, be directed to an acoustical-electrical transducer having only one magnetic circuit.

Referring to FIG. 1, the transducer comprises a yoke 1 and an anisotropic ferromagnetic body 4 which contacts the end of one leg of said yoke 1. Magnetic flux produced by a permanent magnet 5, which is spaced both from one leg of yoke 1 and from one end of ferromagnetic body 4, passes through said anisotropic ferromagnetic body 4 and enters said yoke 1 in the path shown by the arrows. The gaps on the opposite ends of magnet 5 are such as to produce a proper flux level depending on the magnetic intensity and on the dimensions of the magnet and the yoke.

The armature 10 comprises an arm having a stylus 6 at one end, and a flux modulating member 7 intermediate the length thereof. The arm is fixed at the other end 8. Said modulating member 7 is spaced from a pole formed by the combination of said anisotropic ferromagnetic material 4 and said yoke 1 by an air gap 11.

In this magnetic circuit, a magnetic leakage flux appears at various points. An important leakage flux is one appearing around said anisotropic ferromagnetic material 4 and at said air gap 11, and thus leakage flux controls the magnetic flux in the yoke 1 by means of the movement of said modulating member 7 in association with the movement of said stylus 6. Said anisotropic ferromagnetic body 4 is arranged so that the direction of easy magnetization thereof coincides with the path of the magnetic flux indicated by the arrows. Consequently, the magnetic leakage flux is greatly reduced around the anisotropic ferromagnetic body 4 and there then appears at the air gap 11 a concentrated magnetic leakage flux which makes possible the use of a small piece of ferromagnetic material for said modulating member 7. The variation in the magnetic flux in the yoke 1 is transformed into an induced voltage by coils 2 and 3 attached to the arms of said yoke, and this voltage is used to produce an acoustic signal.

It is preferred, in order to achieve a further concentration of said leakage flux at said air gap 11, that the portion 12 at the pole of the one leg of said yoke 1 also be of anisotropic ferromagnetic material having the easy magnetization direction thereof coinciding with the magnetic flux path as indicated by the arrow. The novel effect can be produced by attaching to the pole of the one leg of the yoke a pole piece 12 made of anisotropic ferromagnetic material in such a way that the reluctance between the opposed abutting faces at 13 between said pole piece 12 and said body 4 is as high as possible.

The leakage flux at said air gap 11 can be more effectively concentrated by making said anisotropic ferromagnetic body 4 tapered at the end adjacent the said air gap 11, as shown in FIG. 1.

It is preferable that said air gap 11 be filled with a rubber damper for making the movement of said flux modulating member 7 smooth. Any soft rubber material can be used for producing the damping effect.

Since the magnetic leakage flux is not required to pass through said armature 10 in the apparatus of the present invention, said armature 10 can be made of lightweight non-magnetic materials such as Al, Mg, Be and their alloys in order to reduce the oscillating mass of the armature. It is preferable to use an armature having a tubular form.

The term "anisotropic ferromagnetic body" used herein is intended to describe a ferromagnetic body which is highly anisotropic with respect to its permeability, i.e., it has a magnetocrystalline anisotropy. A ferromagnetic crystal is easily magnetizable in one crystallographic direction by applying a minimum external magnetic field than in any other crystallographic direction even when it has a spherical shape. The materials used in the present invention should have a fairly large magnetocrystalline anisotropy. Therefore, crystals of a unidirectional nature, such as those having hexagonal or tetragonal structures, are preferred over cubic crystals. The materials usable in the present invention should exhibit anisotropic behavior throughout. In this regard, single crystals or alligned crystallites are suited for use with the invention of the present application.

One suitable material is a single crystal of $Fe_5Ge_3$ which crystallizes in a hexagonal $B8_2$ type structure and has a highly anisotropic behavior. The *c*-axis of $Fe_5Ge_3$ is the hard axis with an anisotropy constant value of $k_1=5\times10^6$ erg/cm.$^3$. The permeability parallel to the *c*-axis is given by the formula $$\mu_c=1+\frac{4\pi M_s^2}{2K_1}=1.4$$

where $M_s$ is the saturation magnetization and is on the order of 500 e.m.u./cm.$^3$. The plane of easy magnetization is the *c*-plane of the crystal in which there is a small anisotropy of six-fold symmetry with an anisotropy constant value of $k_3=1.2\times10^2$ erg/cm.$^3$. Assuming the coherent rotation of magnetization in the basal plane, permeability parallel to the basal plane is given by $$\mu_a=1+\frac{4\pi M_s^2}{36K_3}=1000$$

The magnetization process actually includes a domain wall displacement, which may result in a higher value.

Another example of a suitable material is aligned crystallites of $Fe_2B$, the $K_1$ value being $-3.0\times10^{-6}$ erg/cm.$^3$.

Considering the anisotropic permeability, a major part of flux in an anisotropic ferromagnetic body passes along the body in the direction of easy magnetization. By making use of this property of an anisotropic ferromagnet, one can concentrate the leakage flux more effectively at the air gap which forms a working space for a modulating member than merely by designing a suitable pole shape, i.e. only by use of shape anisotropy.

Figure 2:
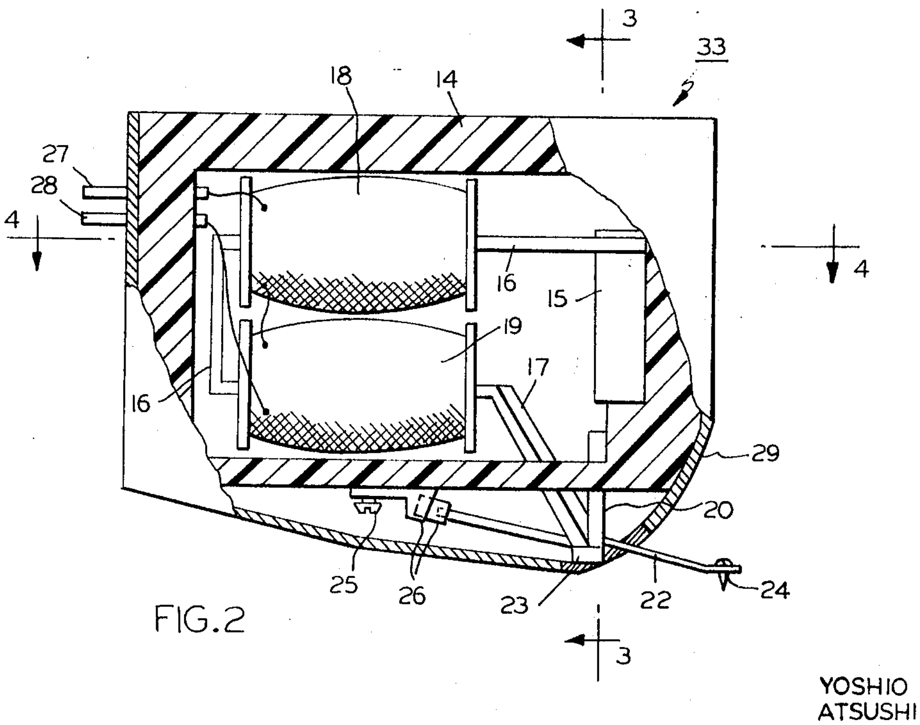
FIG. 2 is a side view, partly broken away and partly in section, of a pickup cartridge according to the present invention.
Figure 3:
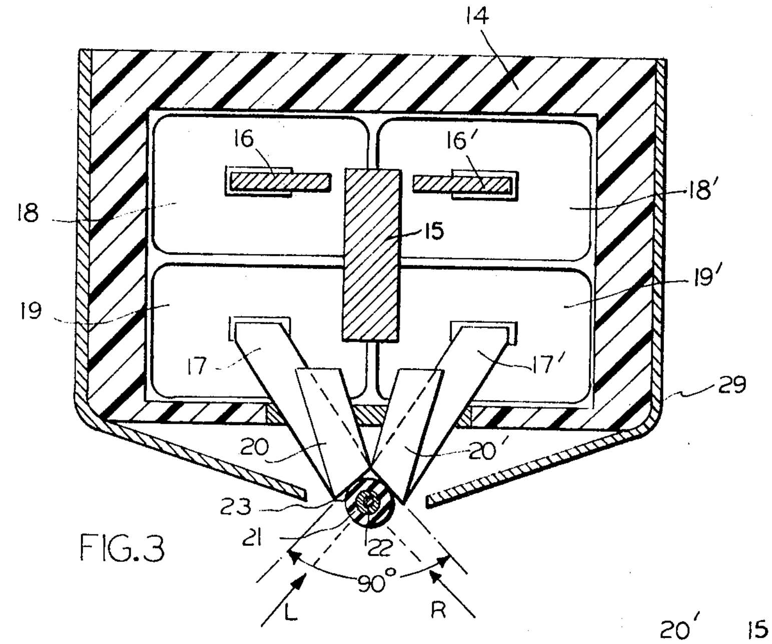
FIG. 3 is a transverse sectional view taken on line 3—3 of FIG. 2.
Figure 4:
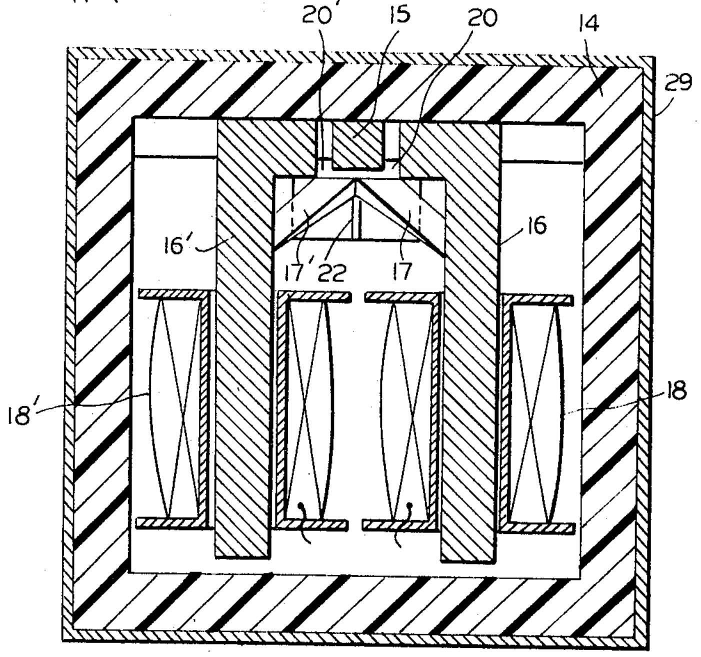
FIG. 4 is a sectional plan view taken on the line 4—4 of FIG. 2.
Figure 5:
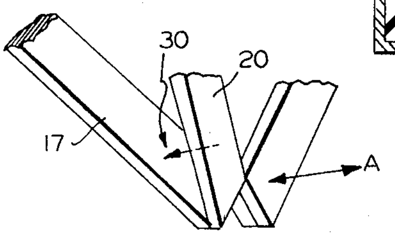
FIG. 5 is a perspective view of a part of the structure of the pickup cartridge of FIG. 2.

The invention will be further described with reference to a stereophonic pickup according to the invention. Referring to FIGS. 2–4, cartridge 33 comprises a body 14 which can be of any suitable nonmagnetic material such as molded plastic. The electromagnetic voltage generating system of the pickup cartridge includes a permanent magnet 15 magnetized in the direction of its length and which can be of alnico metal or a barium ferrite, and a pair of yokes 16 and 16′, each of which has two coils 18, 19 and 18′, 19′, respectively, around the respective legs of the yokes. The ends of the one legs of the yokes 16 and 16′ are formed in the shape of pole pieces 17 and 17′ which contact pole pieces 20 and 20′ of anisotropic ferromagnetic material, as is clearly seen in FIGS. 3 and 5. The direction in which it is most difficult to magnetize the anisotropic ferromagnetic bodies 20, 20′ is normal to the plane of the drawing in FIG. 3, and the direction in which magnetization of the anisotropic ferromagnetic bodies 20, 20′ is least difficult is the plane of the drawing in FIG. 3.

The ends of the pole pieces 17 and 20 are even with each other, as are the ends of pole pieces 17′ and 20′. The flat surface formed by the ends of pole pieces 17 and 20 is perpendicular to the flat surface formed by the ends of pole pieces 17′ and 20′.

In the angle between the ends of pole pieces 17 and 20 and 17′ and 20′ is cylindrical flux modulating member 21 of permeable ferromagntic material, such as permalloy, which is attached to cantilever armature 22.

The modulating member 21 is surrounded by a damper 23 having cylindrical shape and made of rubber. Cantilever armature 22 has a stylus 24 on the free end thereof, the other end being fixed to the body 14 by means of a set screw 25 through a rubber damping element 26.

The coil 18 and 19 are connected in series and the ends of the windings are connected to terminals 27 and 28. Coils 18′ and 19′ are also connected in series and the ends of the windings are connected to terminals similar to terminals 27 and 28.

The body 4 is covered by a cover 29 of permeable ferromagnetic metal.

The pickup of FIGS. 2–5 operates as follows. A part of the magnetic flux from the said permanent magnet 15 flows through pole pieces 20, modulating member 21, pole piece 17 and back through yoke 16 to the opposite pole of permanent magnet 15, these elements forming one stereophonic pickup channel.

Similarly, a part of the magnetic flux from permanent magnet 15 flows through pole pieces 20′, modulating member 21, pole piece 17′, yoke 16′ and back to permanent magnet 15, these elements forming the other stereophonic pickup channel.

Undulations along the walls of the record groove will change the position of modulating member 21 so as to modulate the flux flow through coil 18 and 19, and 18′ and 19′ respectively. Undulations in one wall of the groove, that to the right in FIG. 3, will cause motion of modulating member 21 in the direction R in FIG. 3 and induce flux changes in yoke 16 but not in yoke 16′, because this movement of modulating member 21 is parallel to the face of the ends of pole pieces 17′ and 20′.

Similarly, undulations in the left wall of the groove cause motion of modulating member 21 in the direction L in FIG. 3 and induce flux change in yoke 16′. Thus, the cartridge can reproduce separate stereophonic signals from the record.

While the stereophonic pickup has been described as having only one permanent magnet 15, it will be clear that a permanent magnet can be provided for each circuit.

The important point in the present invention is the provision of the anisotropic ferromagnetic body as a pole piece. The direction in which it is difficult to magnetize the anisotropic ferromagnetic body lies in the direction A in FIG. 5, and it is easy to magnetize in any direction perpendicular to A. When flux from magnet 5 flows toward the air gap where the modulating member 21 is located, there is a part of the leakage flux that does not cross the air gap, but rather passes across space 30 (FIG. 5) and enters pole piece 17. This part of the flux is not modulated by movement of the modulating member 21, but merely increases the flux level in the yoke and reduces the reproducing sensitivity. As is obvious from the anisotropic magnetizing characteristic of pole piece 20, this part of the flux is greatly reduced in the present invention.

Thus, there has been provided a variable reluctance type acoustical electrical transducer which will reproduce signals recorded stereophonically on a disc-shaped record.

What is claimed is:

1. An acoustical electrical transducer comprising a cantilever armature on said transducer and having a stylus at the free end thereof, a flux modulating member of permeable material on said cantilever armature, a permanent magnet, at least one pole piece of anisotropic ferromagnetic material magnetically coupled to one of the poles of said magnet, at least one yoke of permeable material having two legs, one of said legs having a pole portion abutting the said pole piece of anisotropic ferromagnetic material, said abutting pole portion and pole piece and said flux modulating member forming an air gap therebetween, the other of said legs being magnetically coupled with the other pole of said magnet, at least one coil around at least one leg of said yoke, and said pole piece of anisotropic ferromagnetic material being shaped for concentrating the magnetic leakage flux in the vicinity of said air gap.

2. An acoustical electrical transducer comprising a cantilever armature on said transducer and having a stylus at the free end thereof, a flux modulating member of permeable material on said cantilever armature, a permanent magnet means, a pair of parallel magnetic flux circuits each comprising a pole piece of anisotropic ferromagnetic material magnetically coupled to one of the poles of said magnet means, a yoke of permeable material having two legs, one of said legs having a pole portion abutting said pole piece of anisotropic ferromagnetic material, said abutting pole portion and pole piece and said flux modulating member forming an air gap therebetween, the other of said legs being magnetically coupled with the other pole of said magnet means, the air gaps of the two magnetic flux circuits coinciding, and a coil around each leg of each yoke, said pole pieces of anisotropic ferromagnetic material being shaped for concentrating the magnetic leakage flux in the vicinity of the air gap.

3. An acoustical electrical transducer as claimed in claim 2, wherein said anisotropic ferromagnetic body is made of a single crystal of $Fe_5Ge_3$.

4. An acoustical-electrical transducer as claimed in claim 2, wherein said anisotropic ferromagnetic body is made of aligned crystallites of $Fe_2B$.

5. An acoustical-electrical transducer as claimed in claim 2, wherein said yoke pole portion is made of anisotropic ferromagnetic material.

References Cited

UNITED STATES PATENTS

| | | | |
|---|---|---|---|
| 3,047,677 | 7/1962 | Pritchard | 179—100.41 |
| 3,067,295 | 12/1962 | Stanton | 179—100.41 |
| 3,088,000 | 4/1963 | Dally | 179—100.41 |

OTHER REFERENCES

Hirsh, Julian D.: "Modern Phonograph Cartridges," "Audio-High Fidelity," pp. 37–38, April 1967.

Bozorth, R. M.: "Ferromagnetism," Van Nostrand Co., New York, 1957, pp. 582–594, 855–856.

McProud, C. G.: How to Make a Stero Phono Pickup," "Audio," February 1958, pp. 17–19.

TERRELL W. FEARS, Primary Examiner

J. ROSENBLATT, Assistant Examiner

U.S. Cl. X.R.

340—174.1; 346—74